United States Patent Office 3,796,627
Patented Mar. 12, 1974

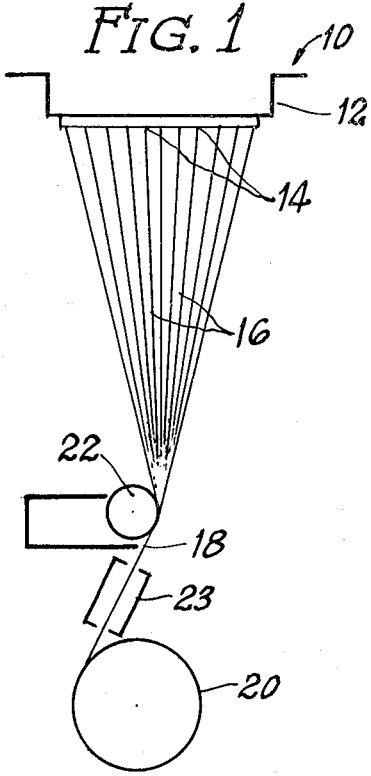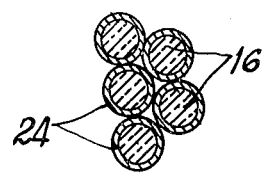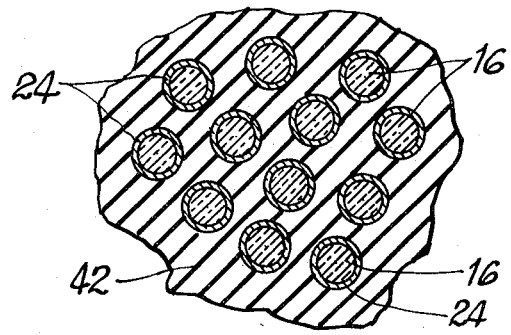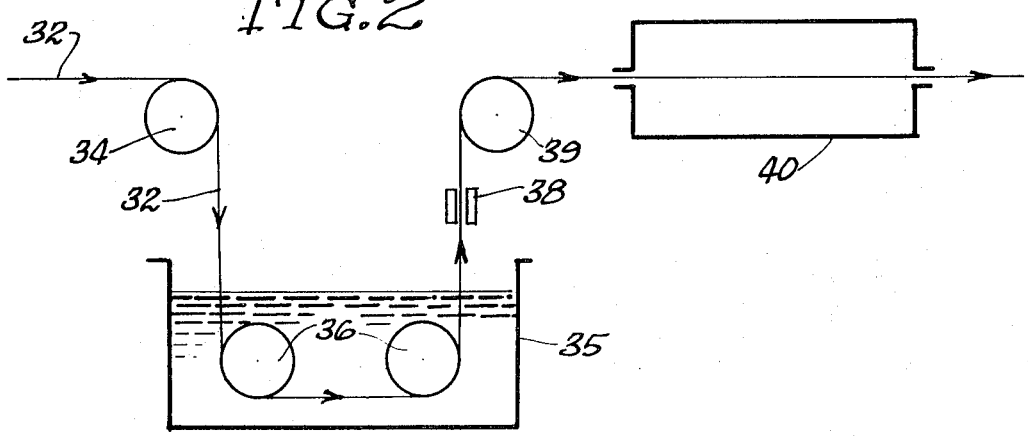

3,796,627
RESORCINOL-ALDEHYDE RESIN AND ELASTO-MER-GLASS FIBER STRUCTURES AND METHOD FOR PREPARATION
Alfred Marzocchi, Cumberland, R.I., assignor to Owens-Corning Fiberglas Corporation
Filed Jan. 26, 1972, Ser. No. 220,900
Int. Cl. C03c 25/02; B44d 1/12
U.S. Cl. 161—143           18 Claims

ABSTRACT OF THE DISCLOSURE

This invention is addressed to the improvement in the bonding relationship between glass fibers and elastomeric material in the manufacture of glass fiber-elastomeric products wherein glass fibers are first treated to form a metal oxide coating and then are further processed to form the glass fibers into bundles which are impregnated with a composition formulated to contain a resorcinol-aldehyde resin component and an elastomer component.

---

This invention relates to elastomeric products reinforced or otherwise combined with glass fibers and it relates more particularly to the method and compositions employed in the treatment of the glass fibers to enhance the bonding relationship between the glass fibers and the elastomeric material for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkyne or alkylidene norbornene, such as 5-alkylidene-2-norbornene and the like in which the alkylidene group numbers from 2-12 carbon atoms.

The invention is addressed to the fuller utilization of the desirable characteristics of glass fibers, such as their high strength, flexibility, thermal stability, chemical stability, inertness, electrical resistance and heat conductive characteristics when used in combination with elastomeric materials as a reinforcement or as a stabilizing agent in belt manufacture, as reinforcing cords and fabrics to increase strength, life, wearability and service characteristics in rubber tires, and as a reinforcement and the like in other elastomeric coated fabrics and a molded elastomeric product.

It is an object of this invention to provide a new and improved method for use in the treatment of glass fibers in forming or afterwards to enable fuller utilization to be made of the desirable characteristics of the glass fibers when used in combination with elastomeric materials in the manufacture of glass fiber reinforced molded products and coated fabrics.

More specifically, it is an object of this invention to provide a method for use in the treatment of glass fibers to improve the processing and the performance characteristics of the glass fibers as a reinforcement for elastomeric materials and for use in the treatment of bundles, strands, yarns, cords and fabrics of glass fibers to enhance their bonding relationship when used in combination with elastomeric materials in the manufacture of glass fiber reinforced plastics, laminates or coated fabrics, and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which:

FIG. 1 is a flow diagram showing the manufacture of continuous glass fibers and the treatment thereof in forming in accordance with the practice of this invention;

FIG. 2 is a flow diagram illustrating the treatment of glass fibers subsequent to their being formed into bundles in accordance with the practice of this invention;

FIG. 3 is a cross-sectional view of glass fibers processed in accordance with the diagram illustrated in FIG. 1; and FIG. 4 is a cross-sectional view of a bundle of glass fibers processed in accordance with the flow diagram of FIG. 2.

Until recently, glass fibers which have been added to or otherwise incorporated with elastomeric materials, in the form of continuous or chopped fibers, have functioned more or less like a filler rather than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

In U.S. Pat. No. 3,479,207 description is made of the use of the oxides of zinc and magnesium on the surfaces of glass fibers which enter into the reaction for cure of neoprene elastomers when the glass fibers are molded with neoprene in the manufacture of glass fiber-reinforced elastomeric products to securely integrate the glass fibers with the continuous phase formed by the neoprene elastomer. Thus, the metal oxide on the surfaces of the glass fibers serves a dual role in that it functions as an anchoring agent and as a curing agent to enhance the cure of the elastomeric material forming the contiguous phase of the glass-fiber elastomeric product.

This invention is addressed to the treatment of glass fibers to enhance the integration of glass fibers with elastomeric materials in the manufacture of glass fiber-reinforced elastomeric products in which glass fibers are first treated with a metallic compound which is capable of forming the corresponding metal oxide in response to heat, moisture and/or oxygen. Thereafter, the fibers are formed into a strand, cord, yarn or fabric, hereinafter referred to generally as a bundle, and the bundle is treated with a combination of a resorcinol-aldehyde resin and an elastomer latex by impregnation whereby the impregnating material serve to separate the individual glass fiber filaments each from the other and thereby cushion the individual glass fibers and prevent their destruction by material abrasion during subsequent processing. It is believed that the metal oxide on the glass fiber surfaces serves to intertie the impregnating material to the glass fiber surfaces and to enhance the rate of cure of the elastomer component of the impregnating composition at a level commensurate with the rate of cure of the elastomeric material constituting the continuous phase with which the resulting glass fiber bundles are combined in the manufacture of glass fiber-reinforced elastomeric products.

The metal oxide preferred for use in the present invention is titanium, and it is particularly preferred to treat the glass fibers in forming or afterwards with titanium lactate to form a titanium lactate coating. The titanium lactate coating can be converted to titanium dioxide and set on the glass fiber by the application of heat. However, other titanium compounds which can be converted to the corresponding oxide can similarly be used. For example, use can be made of a variety of organic titanates such as the lower alkyl titanates (e.g. the methyl, ethyl, isopropyl, etc. titanates) in addition to the other titanium salts.

While not equivalent to titanium, use can also be made of other metals including the salts of aluminum and zinc which can be converted to the corresponding oxide in response to heat. Illustrative are the lactates, acetates, chlorides, etc. It is also possible to use an acidic solution of the metal whereby neutralization of the solution with a base such as NaOH, KOH, etc. causes the hydroxide to precipitate onto the glass fiber surfaces. The hydroxide can then be converted to the corresponding oxide by heating.

It is generally preferred that the metal oxide form a continuous coating on the glass fiber surfaces, although it is sufficient if the oxide is present as a coating on only part of the glass fiber surfaces. It is usually sufficient to treat the glass fibers to deposit on the surfaces thereof the metal oxide in an amount of 0.1 to 4% by weight of the glass fibers, and preferably 0.3 to 2.0% by weight.

After the metal oxide is set on the surfaces of the individual glass fibers, the fibers are then formed into a bundle and impregnated with an impregnant composition formulated to contain a resorcinol-aldehyde resin component and an elastomer component. Without limiting the present invention as to theory, it is believed that the foreing metal oxides are highly reactive with the resorcinol-aldehyde resin component and the elastomer component during cure and/or vulcanization of the impregnated bundle in combination with an elastomeric material in the manufacture of glass fiber bundle-reinforced elastomeric products. Thus, the impregnant in the bundle is anchored to the glass fiber surfaces by means of the metal oxide, and the impregnant serves to intertie the glass fiber surfaces to the elastomer of the reinforced product.

Having described the basic concepts of this invention, reference is now made to the following examples, which are provided by way of illustration and not by way of limitation of the practice of the invention.

EXAMPLE 1

A titanium lactate treating composition is formulated as follows:

|  | Percent by wt. |
|---|---|
| Titanium lactate | 3.10 |
| Lubricant (fatty acid amide) | .25 |
| Water | 96.65 |

The titanium lactate can be applied to the glass fiber surfaces in any desired manner, such as by a wiping pad, spray coating, etc. Referring now to the schematic diagram of FIG. 1, glass is melted in a glass melting furnace 10 having a bushing 12 on the bottom side. The bushing is provided with a plurality of openings extending therethrough, and the molten glass flows gravitationally through hundreds of these small openings in the bushing to form streams 14 which are rapidly attenuated into fine glass filaments 16 by winding the filaments about a rapidly rotating drum 20.

The filaments 16 may be coated with the lactate solution as they are gathered to form a strand 18. For this purpose, use is made of an applicator 22 which is illustrated as a wiping pad that is constantly wet with the treating composition.

Heating the strand 18 to convert the lactate to the corresponding oxide may be effected by passing the strand 18 containing the titanium lactate on the surfaces thereof through an oven or the like 23, in which the strand is heated to an elevated temperature. It is generally sufficient to heat the strand to a temperature within the range of 300 to 800° F. to convert the metal salt to the corresponding oxide.

The resulting strand is shown in its preferred form in FIG. 3 of the drawing wherein the metal oxide forms a very thin coating 24 on the glass fibers 16. As indicated above, it is not necessary that the coating 24 of the metal oxide be continuous.

After forming the metal oxide on the glass fibers as described above, the glass fibers are formed into cords, yarns, strands or fabrics, hereinafter referred to as bundles, and the bundles are subjected to impregnation with the following composition:

Impregnating composition

|  | Percent by wt. |
|---|---|
| Natural rubber latex-resorcinol aldehyde resin (Lotol—38% solids) | 35 |
| Water | 65 |

Impregnation with the aqueous impregnating composition can be carried out by any means of impregnation, such as by immersion of the bundle in a bath of the composition. Referring more specifically to FIG. 2, the glass fiber bundle is advanced over a guide roller 34 for passage downwardly into the bath 35 containing the foregoing impregnating composition. The bundle is then turned under rollers 36 to effect a sharp bend which operates to open the bundle to enable more complete penetration of the aqueous impregnating composition into the bundle.

The impregnated bundle is then raised from the bath for passage through a roller or die 38 which operates to remove excess impregnating composition from the bundle and to work the impregnating composition into the bundle. Thereafter the endless bundle is advanced over roller 39 into a drying oven 40, preferably in the form of an air drying oven maintained at an elevated temperature (e.g. 150 to 350° F.) to accelerate removal of the aqueous diluent and to set the impregnating material in situ on the glass fiber bundle.

The resulting bundle is shown in FIG. 4 of the drawing and comprises a plurality of glass fibers 16 having a very thin metal oxide coating 24 covering at least a portion of the surfaces thereof. The impregnant 42 completely fills the interstices between the glass fibers and serves to separate the individual fibers each from the other to define a unitary bundle structure.

Suitable resorcinol formaldehyde resins and combinations thereof with natural rubber are marketed by the U.S. Rubber Co. under the trade name "Lotol." For the preparation of same, reference can be made to Canadian Pat. No. 435,754 in which description is made of the reaction of resorcinol and formaldehyde in the presence of substantial amounts of short chained alkyl amines for the purpose of stabilizing the reaction and the products formed, as well as the description of the combination of the formed resin with rubber latex.

The relative proportions of the resin component and the elastomer component are not critical and can be varied within wide ranges. Best results are usually obtained when the impregnant contains 5 to 40 parts by weight of the resorcinol-aldehyde resin per 100 parts by weight of the elastomer.

The use of other metals and other impregnants may be illustrated by the following examples.

EXAMPLE 2

Glass fibers having a titanium oxide coating on the surfaces in an amount of 2.1% by weight and processed in accordance with the procedure of Example 1 are formed into bundles and impregnated with a resorcinol-aldehyde resin-elastomer impregnating composition of the type disclosed in U.S. Pat. No. 3,424,608 formulated as follows:

| | Parts by wt. |
|---|---|
| Resorcinol-formaldehyde resin | 2–10 |
| Formaldehyde (37% solution) | 1–3 |
| Concentrated ammonium hydroxide | 2–5 |
| Vinyl pyridine - butadiene - styrene terpolymer (42% solids) | 15–50 |
| Neoprene rubber latex (50% solids) | 25–50 |
| Butadiene latex (60% solids) | 5–15 |
| Alkali metal hydroxide | .05–0.2 |

Water is incorporated with the foregoing materials in amounts to produce an impregnating composition having a minimum solids content of 10% and a maximum solids content of about 50% by weight. Introduction should be made in an amount to impregnate with a dry solid of 5–25% by weight of the glass fiber system and preferably 10–15% by weight.

The vinyl pyridine-butadiene-styrene terpolymer is commercially available from General Tire and Rubber Co. under the trade name "Gentac" and also from the Goodyear Rubber and Chemical Co. under the trade name "Pliolite." The terpolymer is usually formed of 15 parts by weight vinyl pyridine, 15 parts by weight styrene and 70 parts by weight butadiene.

EXAMPLE 3

Using the procedure described in Example 1, glass fibers are treated with an aqueous solution of aluminum acetate formulated as follows:

| | Percent by wt. |
|---|---|
| Aluminum acetate | 5.0 |
| Lubricant | 0.1 |
| Water | 94.9 |

Thereafter, the fibers are heated to about 500° F. to convert the acetate to the corresponding oxide. The fibers are then formed into bundles and the bundles are impregnated with the impregnating composition illustrated in Example 1.

EXAMPLE 4

A treating composition formulated as follows:

| | Percent by wt. |
|---|---|
| Zinc chloride | 1.0 |
| Lubricant | 0.1 |
| Water | 98.9 | is contacted with glass fibers and the pH of the solution is raised to about 8 by the addition of a base to the treating composition while in contact with the fibers to precipitate zinc hydroxide onto the surfaces of the glass fibers.

The glass fibers are removed from the treating composition and heated to a temperature of about 500° F, to convert the hydroxide to the corresponding oxide.

The glass fibers containing zinc oxide are then impregnated with the following composition:

Impregnating composition

| | Parts by wt. |
|---|---|
| Resorcinol-formaldehyde resin (70% solids) | 5.0 |
| Vinyl pyridine - butadiene - styrene terpolymer (41% solids) | 50.0 |
| Water | 70.0 | to form a unitary bundle for combination with elastomeric materials in the manufacture of glass fiber reinforced elastomeric products.

EXAMPLE 5

Using the procedure described in Example 1, glass fibers are treated with the following composition:

| | Percent by wt. |
|---|---|
| Tetraethyl titanate | 4.0 |
| Acetone | 96.0 |

After coating with the tetraethyl titanate, the glass fibers are exposed to moisture by application of a mist to convert the titanate to titanium dioxide. The fibers are then formed into bundles and impregnated with the impregnating composition illustrated in Example 1.

It is desirable to achieve as complete impregnation as possible into the bundles of glass fibers to more effectively separate the fibers one from the other by the impregnating material since the solids of the impregnant are effective as a coating on the glass fibers to cushion the fibers and to protect the fibers against destruction by mutual abrasion. Thus, the deeper the penetration of the impregnant into the bundle, the more effective the bond between the glass fibers forming the bundle and the elastomeric material with which the bundles of glass fibers are combined in the manufacture of glass fiber-elastomeric products.

In fabricating the combinations of the glass fiber bundle prepared in accordance with the contents of this invention with elastomeric material, or otherwise laid down in the desired arrangement for combination with the elastomeric material as in the manufacture of glass fiber-reinforced belts, or in the manufacture of rubber tires reinforced with cords of glass fibers, the combination of the bundles of glass fibers and elastomeric material is processed in a conventional manner by molding or curing under heat and compression or by vulcanization to advance the elastomeric material to a cured or vulcanized stage while in combination with the impregnated bundles of glass fibers, whereby the bundle of glass fibers becomes securely integrated with the elastomeric material.

In the final system the elastomeric material with which the glass fibers are combined constitutes a continuous phase. Such continuous phase of elastomeric material may comprise the same elastomeric as incorporated into the impregnating composition or the elastomeric material can differ from the elastomer component of the impregnant. It is believed that the tie-in between the impregnated bundles of glass fibers and the elastomeric material forming the continuous phase occurs primarily during cure or vulcanization of the elastomeric material in the fabrication of the fiber-reinforced elastomeric product. It is also believed that the interreaction between the metal oxide coating on the glass fiber surfaces with the resorcinol-aldehyde resin component and the elastomer component of the impregnant similarly occurs when the impregnated bundle is subjected to heat and pressure during the molding of the final product.

It will be apparent that various changes and modifications can be made in the details of formulation, procedure and use without departing from the spirit of the invention, especially as defined in the following claims.

I claim:

1. A glass fiber bundle formed of a plurality of glass fibers, with glass fibers having a coating of an oxide of a metal selected from the group consisting of titanium, aluminum and zinc on the surfaces thereof, and an impregnant in the bundle comprising a mixture of a resorcinol-aldehyde resin and an elastomer.

2. A bundle as defined in claim 1 wherein the metal oxide is titanium oxide.

3. A bundle as defined in claim 1 wherein the metal oxide coating constitutes from 0.1 to 4% by weight of the glass fibers.

4. A bundle as defined in claim 1 wherein the elastomer is natural rubber.

5. A bundle as defined in claim 1 wherein the impregnant constitutes from 5 to 25% by weight of the impregnated bundle.

6. A bundle as defined in claim 1 wherein the glass fibers forming the bundle are in the form of strands of glass fibers plied together.

7. A bundle as defined in claim 6 wherein the strands of glass fibers are twisted together.

8. In the method for the manufacture of glass fiber-elastomeric materials in which bundles of glass fibers are combined with an elastomeric material forming a continuous phase, the improvement in the bonding of the glass fiber bundles to the elastomeric material comprising the steps of forming a coating comprising an oxide of a metal selected from the group consisting of titanium, aluminum and zinc on the surfaces of individual glass fibers, forming the glass fibers into a bundle and impregnating the bundle with a composition comprising a mixture of a resorcinol-aldehyde resin and an elastomer.

9. A method as defined in claim 8 wherein the metal oxide is titanium oxide.

10. A method as defined in claim 8 wherein the elastomer is different from the elastomeric material forming the continuous phase.

11. A method as defined in claim 8 wherein the metal oxide coating is formed by coating the glass fibers with a compound of the metal which can be converted to the corresponding oxide by heat and then heating the glass fibers to convert the compound to the oxide.

12. A method as defined in claim 11 wherein the glass fibers are coated with a hydroxide of the metal by coating the glass fibers with an aqueous solution of a salt of the metal and then adjusting the pH of the solution to precipitate the hydroxide onto the glass fiber surfaces.

13. A bundle as defined in claim 8 wherein the glass fibers forming the bundle are in the form of strands of glass fibers plied together.

14. A bundle as defined in claim 13 wherein the strands of glass fibers are twisted together.

15. In a glass fiber-reinforced elastomeric product wherein an elastomeric material constitutes a continuous phase in which bundles of glass fibers are distributed, the improvement in the bonding relationship between the bundles of glass fibers and the elastomeric material constituting the continuous phase comprising a glass fiber bundle formed of a plurality of glass fibers, with glass fibers having a coating of an oxide of a metal selected from the group consisting of titanium, aluminum and zinc on the surfaces thereof, and an impregnant in the bundle comprising a mixture of a resorcinol-aldehyde resin and an elastomer.

16. A product as defined in claim 15 wherein the metal oxide is titanium.

17. A product as defined in claim 15 wherein the glass fibers forming the bundle are in the form of strands of glass fibers plied together.

18. A product as defined in claim 15 wherein the strands of glass fibers are twisted together.

References Cited

UNITED STATES PATENTS 3,479,207  11/1969  Marzocchi _____ 117—76
3,558,416  1/1971  Craven _____ 161—143

GEORGE F. LESMES, Primary Examiner

M. B. WITTENBERG, Assistant Examiner

U.S. Cl. X.R.

117—72, 77, 126 GF, GB; 161—170, 192, 202

Disclaimer and Dedication 3,796,627.—*Alfred Marzocchi*, Cumberland, R.I. RESORCINOL-ALDEHYDE RESIN AND ELASTOMER-GLASS FIBER STRUCTURES AND METHOD FOR PREPARATION. Patent dated Mar. 12, 1974. Disclaimer and dedication filed July 18, 1973, by the assignee, *Owens-Corning Fiberglas Corporation*.

Hereby disclaims and dedicates to the Public the portion of the term of the patent subsequent to Nov. 18, 1986.

[*Official Gazette July 9, 1974.*]